United States Patent Office 3,781,291
Patented Dec. 25, 1973

3,781,291
SILYLATED 1,4-DIHYDROPYRIDINES
Reinhard A. Sulzbach, Basseisdoferstrasse 111, Kloten, Switzerland, and Abul F. M. Iqbal, Steinackerstrasse 8, Glattbrugg, Switzerland
No Drawing. Filed May 26, 1971, Ser. No. 147,191
Int. Cl. C07d 29/40
U.S. Cl. 260—290 H                                    4 Claims

ABSTRACT OF THE DISCLOSURE

Silylated nitrogen containing heterocyclic compositions of the formula

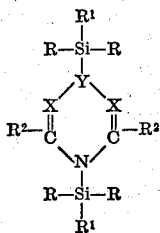

wherein X and Y are selected from the group consisting of C—$R^3$ and N with the proviso that no nitrogen atom is adjacent to another nitrogen atom; R is a member selected from the group consisting of hydrocarbyl, heterocyclic, silyl and stannyl wherein the member may be attached via an oxygen atom; $R^1$ is a member selected from the group consisting of hydrocarbyl, heterocyclic, silyl, stannyl and hydrogen wherein the member may or may not be attached via an oxygen atom; $R^2$ is a member selected from the group consisting of hydrocarbyl, heterocyclic, silyl, stannyl, hydrogen, tertiary amino, phosphino, oxophosphino, acetal and ketal wherein said member may or may not be attached via an oxygen atom and wherein $R^2$ and X together may be an ortho condensed cyclic or polycyclic system; and $R^3$ is a member selected from the group consisting of hydrocarbyl, heterocyclic, silyl, stannyl, hydrogen, tertiary amino, phosphino, oxophosphino, acetal and ketal wherein said member may or may not be attached via an oxygen atom.

Exemplary of such compositions are 1,4-bis-(trimethylsilyl)-1,4-dihydropyridine, 1,4,4-tris-(trimethylsilyl)-1,4-dihydropyridine, 1,4-bis-(trimethyl)-1,4-dihydroquinoline, and 1,4 - bis - (trimethylsilyl) - 1,4 - dihydropyrazine. The compositions of the invention are useful as catalysts for the addition of chlorosilanes to esters and ketones and as reducing agents for preparing hydrogenation catalysts from noble metal compounds such as rhodium and platinum.

BACKGROUND OF THE INVENTION

Field of the invention

This invention relates to silylated nitrogen containing heterocyclic compositions. In a particular aspect, this invention relates to silylated nitrogen containing heterocyclic compositions of the formula

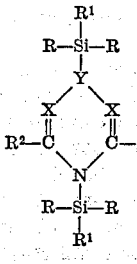

wherein X and Y are selected from the group consisting of C—$R^3$ and N with the proviso that no nitrogen atom is adjacent to another nitrogen atom; R is a member selected from the group consisting of hydrocarbyl, heterocyclic, silyl and stannyl wherein the member may or may not be attached via an oxygen atom; $R^1$ is a member selected from the group consisting of hydrocarbyl, heterocyclic, silyl, stannyl and hydrogen wherein the member may or may not me attahed via an oxygen atom; $R^2$ is a member selected from the group consisting of hydrocarbyl, heterocyclic, silyl, stannyl, hydrogen, tertiary amino, phosphino, oxophosphino, acetal and ketal wherein said member may or may not be attached via an oxygen atom and wherein $R^2$ and X together may be an ortho condensed cyclic or polycyclic system; and $R^3$ is a member selected from the group consisting of hydrocarbyl, heterocyclic, silyl, stannyl, hydrogen, tertiary amino, phosphino, oxophosphino, acetal and ketal wherein said member may or may not be attached via an oxygen atom. In a further aspect, this invention relates to the preparation of said silylated nitrogen containing heterocyclic compositions.

Description of the prior art

The silylation of pyridines using an organic hydrosilane in the presence of a catalyst such as pallidum, rhodium, nickel, platinum, iridium or ruthenium is well known (N. C. Cook et al., Journal American Chemical Society 88, 3396, 1966 and French Pat. 1,481,448, issused May 19, 1967). By this general method a mixture of different products comprising 1-trimethylsilyl-1,4-dihydropyridine, N,N' - bis-(trimethylsilyl)-1,1'-dihydro-4,4'-bipyridine, 1-trimethylsilyl-1,2,3,6-tetrahydropyridine, 1-trimethylsilyl-1,2,3,4-tetrahydropyridine, 1 - trimethylsilyl-1,2-dihydropyridine, 1,5-bis-(trimethylsilyl)-1,2-dihydropyridine and 1,5-bis-(trimethylsilyl) - 1,2,3,4 - tetrahydropyridine has been obtained. The first mentioned two compounds are the principal products of the reaction mixture. According to this previously known process, 1,4-disilylated 1,4-dihydropyridine is not obtained. On comparing the compounds of the present invention, e.g., 1,4-bis-(trilower-alkylsilyl)-1,4-dihydropyridine with, e.g., 1,5-bis-(trialkylsilyl)-1,2-dihydropyridine as obtainable but in insignificant amount by the known method, it is apparent that not only the silyl groups are in different positions on the pyridine nucleus, but also the double bonds. Since the ethylenic bonds of the compounds of the present invention are not conjugated as in the prior art compound, the reactions involving their double bonds will be different. For example, the Diels-Alder reactions with dienophiles will be avoided with compounds of the present invention but not with the prior art compounds.

It is known that 4-triphenylsilyl-1,4-dihydropyridine is prepared by reacting pyridine with triphenyllithium in tetrahydrofuran at reflux temperatures for approximately one hour (D. Wittenberg et al., Chemistry and Industry, p. 390, 1958). However, this previously known method is not applicable for producing trialkylsilyl derivatives such as, for example, 4-methylsilyl 1,4-dihydropyridine or N- silylated derivatives.

SUMMARY OF THE INVENTION

It is an object of the present invention to provide new silylated nitrogen containing heterocyclic compositions of the above general formula.

It is a further object of the present invention to provide a convenient process for producing the silylated nitrogen containing heterocyclic compositions of the present invention.

It is an additional object to provide a proecss for conversion of the compositions of the present invention to the corresponding 4-silyl-4,4-dihydropyridines, 4-silyl-1,4-dihydrodiazines and 4-silyl-1,4-dihydrotriazines by hydrolysis of the N- silyl group.

Another object of the present invention is the conversion of such compositions having a hydrogen atom in the 4 position to the corresponding wholly aromatic 4-silylated N-heterocycles by oxidative or pyrolytic removal of the N-silyl group.

A still further object of the present invention is the conversion of compounds of the present invention to the corresponding 4-silylated full hydrogenated N- heterocycles by catalytic hydrogenation and subsequent hydrolysis of the N-silyl group.

It has been found in accordance with the present invention that compounds of the formula (I)
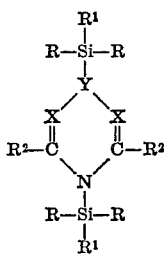

are obtained by reacting a heterocyclic compound of the formula (II)
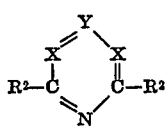

wherein X, Y and $R^2$ have the same significance as above with an organic halosilane of the formula $$RRR^1SiA$$

wherein R and $R^1$ have the same significance as above and A is a chlorine or bromine atom in the presence of an alkali metal and an inert polar solvent. The reaction is typically carried out at a temperature in the range of from about —50 to about 100° C. under substantially anhydrous non-oxidizing reaction conditions.

DETAILED DESCRIPTION

The term "pyridine" or "pyridine derivatives" as employed herein is to be understood in the broadest sense. It comprises compounds having at least one moiety with the basic structure

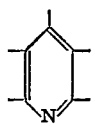

Consequently, the term "silylated 1,4-dihydropyridine" as used herein embraces resulting derivatives having one moiety with the basic structure

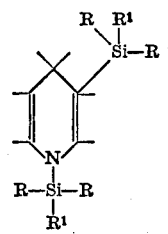

in which the aromatic character of the pyridine is entirely suppressed. On contemplating the compositions of the present invention, it becomes obvious how the non-occupied valencies shown in this and the preceding formula can be filled.

Any suitable pyridine material may be employed in the process of the present invention. Many such suitable pyridines are known and are available to the art. Included among such suitable pyridines are those described in "The Chemistry of Heterocyclic Compounds, Pyridine and its Derivatives, Part II" (1961, Interscience Publishers, Inc., New York). Such starting compounds include pyridine, alkyl pyridines such as picolines, lutidines, collidines, tetramethylpyridines and pyridines containing higher alkyl radicals such as, for example, those having up to about 39 carbon atoms in the alkyl group, e.g., the well known 4-PyCH($C_{18}H_{37}$)$_2$. Such alkyl pyridines are listed in Table V–4 of the referred to text. Moreover, there can also be used cycloalkyl pyridines such as cyclopropylpyridines, dicyclopentylpyridines and 6-(2,2,6-trimethylcyclohexyl)-2,4-lutidine. The term "cycloalkyl pyridine" is taken to include cycloalkeno pyridines such as cyclopentenopyridine. Such compounds are compiled in Tables V–5 and V–6 of the cited text.

From the Formula II it becomes apparent that the class of cycloalkeno pyridines is within the scope of the formula when $R^2$ and X are linked together to form an ortho condensed cyclic system. The following illustration is presented. Assuming that X signifies $CR^3$ groups, that $R^2$ and $R^3$ are alkyl groups, e.g., ethyl groups, and that one or both of the $R^2$ groups is linked together with an adjacent $R^3$ group, then the alkyl groups or alkylene groups respectively, form an ortho condensed ring, e.g., a six-membered ring. The starting compound in this instance may be either 2,3-cyclohexenopyridine

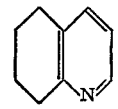

(tetrahydroquinoline) or 2,3,5,6 - bis - (cyclohexeno)-pyridine

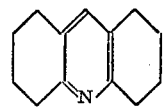

(octahydroacridine).

Other suitable starting compounds are aralkyl pyridines such as benzylpyridine, naphthylmethylpyridine and 9-(2-pyridyl)-fluorene, of which numerous species are found in Table V–7 of the cited text.

The aliphatic, cycloaliphatic and araliphatic substituted pyridines can show ethylenic unsaturation. Examples of such compounds are vinylpyridines, dodecenylpyridines, cyclohexenylpyridines and the large class of well known stilbazoles (styrylpyridines), examples of which are shown in Tables V–8, V–9 and V–10 of the referred to text.

Additional pyridines suitable for carrying out the process of the present invention are aryl pyridines such as phenylpyridine, pentaphenylpyridine and acenaphthenylpyridine, of which numerous examples are listed in Table V–13 of the above mentioned text. Other suitable pyridines include those with ortho condensed aryls such as quinoline, acridine, azanaphthacence, azapyrene and similar derivatives having up to about six linearly or angularly condensed benzene nuclei attached to the fundamental pyridine nucleus. To the skilled worker, it is clear that this type of compound will also be within the scope of Formula II. Thus, the ortho condensed cyclic system may be cycloaliphatic or aromatic and combined alicyclic-aromatic systems may occur as well.

Additional useful starting pyridines are those having at least one heterocyclic substituent such as, for example, tetrahydrofurylpyridine, dihydrofurylpyridine, oxazolidinylpyridine, piperidinopyridine, isooxazolidinylpyridine, tetrahydropyranylpyridine and corresponding analogs containing S, NH or NR instead of O. Further examples are found in Tables V–14 and V–15 of the referred to text. In order to minimize uncontrollable side reactions, it is preferred that the heterocycles contain not more than one ethylenic bond with those saturated compounds being especially preferred.

Pyridines containing one or more pyridine units are of particular interest in the present invention since such compounds can repeatedly undergo the reaction of the invention. Examples of such compounds include diazaanthracenes, phenathrolines, pyridylquinolines, pyridylacridines, bipyridines, tripyridines, bis-(pyridyl)-pyridines, tris-(pyridyl)-pyridines, polypyridines, methylenebipyridines, vinylenebipyridines, dodecamethylenebipyridines and tetrakis-(pyridyl)-butanes. Additional compounds are shown in Tables V-4 to V-15 in the above cited text.

When the NH group is a constituent of the heterocycle, generally it may also undergo silylation in the reaction of the invention. The same is true of external primary and secondary amino groups, as well as hydroxyl and mercapto groups. In such instances, the amount of reactants, i.e., halosilane and alkali metal are correspondingly increased. Of course, such additional silylation is not necessary when the amino groups are tertiary and the hydroxyl and mercapto groups are etherified.

Inert substituents which generally do not have an adverse affect on the course of the reaction of the present invention are tertiary amino $R_3N—$, silyl $R_3Si—$,

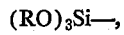

siloxy $R_3SiO—$, $(RO)_3SiO—$, stannyl $R_3Sn—$, stannoxyl $R_3SnO—$, phosphino $R_3P—$, oxophosphino $R_3P(O)—$, thiophosphino $R_3P(S)—$, alkoxy, aroxy, aralkoxy $RO—$ groups, the corresponding thioether RS— groups, acetal and ketal $(RO)_2C=$ groups, where R is an organic group as commonly occurring in such groups. Although other groups such as cyano NC—, ester ROC(O)—,

and nitro $O_2N—$ groups, or halogen atoms may not resist the reaction of invention, but suffer various modifications or be replaced, they generally will not hinder the desired reaction, i.e., the formation of silylated 1,4-dihydropyridines, when possible additional consumption of alkali metal and/or halosiline is considered. It is accordingly apparent that the reaction of the present invention has wide applicability.

From the above explanation, based on the use of pyridines, pyridine derivatives and compounds showning one or several pyridine structural units, it is easily understood by those skilled in the art that the present invention, as shown above, will also be applicable to starting materials having at least 1,4-diazine unit, 1,3-diazine unit or 1,3,5-triazine unit, as shown by the following formulae

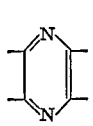 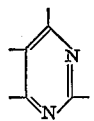 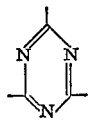

Viewing Formula I it becomes apparent how the non-occupied valencies shown in the above formulae will be filled. The basic compounds having hydrogen atoms in the non-occupied valencies are commonly denoted pyrazine, pyrimidine and symmetric triazine, whereas the benzo derivatives are called quinoxaline and quinazoline.

It has been shown above with relation to pyridine that the aromatic N-heterocycle capable of enduring 1,4-silylation may recur in the same molecule. Consequently, it is understandable that also a combination of the four fundamental units, namely pyridine, 1,4-diazine, 1,3-diazine and 1,3,5-triazine may occur in a single compound. Examples include pyridylquinoxalines, pyridoquinoxalines, pyrimidoquinoxalines and triazinylquinolines. Such compounds are known and many are shown in the previously referred to textbook.

The second reactant in the reaction of the present invention is the group known as organic chloro and bromo silanes as represented by the general formula RRR'SiA wherein R and $R^1$ are lower alkyl radicals such as methyl, ethyl, n-propyl, isopropyl, n-butyl, iso-butyl, sec-butyl, tert-butyl and higher alkyl groups having up to, for example, about 24 carbon atoms such as dodecyl, stearyl and tetracosyl; moreover cycloalkyls such as cyclobutyl, cyclopentyl, cyclohexyl and higher alicyclic groups having up to 12 carbon atoms such as cyclooctyl, cyclododecyl and bicyclohexyl; moreover aralkyls such as benzyl, cuminyl, phenylethyl, phenylpropyl, diphenylmethyl, triphenylmethyl, α-naphthylmethyl, β-naphthylmethyl, 1-(α-naphthyl)-ethyl, 2 - (α-naphthyl)-ethyl, 1-(β-naphthyl)-ethyl and 2-(β-naphthylethyl); moreover alkaryls such as tolyl, xylyl, mesityl, duryl, ethylphenyl, cumyl, tert-butylphenyl, α-methylnaphthyl and β-methylnaphthyl; moreover aryls such as phenyl, o-biphenyl, m-biphenylyl, m-terphenylyl, p-terphenylyl, 1-naphthyl, 2-naphthyl, 2-anthryl, 9-anthryl, 1-, 2-, 3-, 4- and 9-phenanthryl; moreover heterocyclic groups such as have already been enumerated above. From this, it is apparent that the halosilanes may show a combination of the cited groups as, for example, dimethylphenylchlorosilane, methyl-diphenylchlorosilane and dimethoxy-butylchlorosilane.

Halosilanes such as 1-chloro-1-methylsilacyclopentane, 1 - bromo-1-ethylsilacyclohexane and 1-chloro-1-phenylsilacycloheptane are intended to be included under the term "halosilane" for the purpose of the present invention. The silacycloalkane typically consists of from three to about eleven recurring $CH_2$ units.

It is understood that chlorosilanes having the Si—Si or Si—O—Si skeleton are considered as being equivalent and also are intended to be included under the term "organic halosilane." Examples of such compounds are pentamethylchlorodisilane and pentamethylchlorodisiloxane.

In carrying out the process of the present invention, the starting compound is brought to reaction with at least a stoichiometric amount of alkali metal and halosilane necessary for the formation of disilylated pyridine, diazine or triazine unit. The reaction occurs with, for example, pyridine according to the following equation

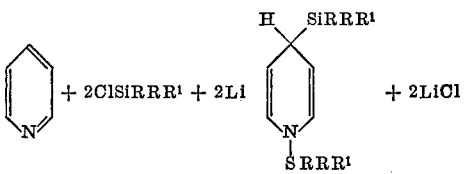

An excess of chlorosilane or bromosilane and sodium, potassium or lithium, of course, may be employed but typically, serves no useful purpose.

It is convenient and desirable to use the alkali metal in the form of a dispersion having a particle size of $<10\mu$. However, a material of greater particle size may also be employed. In general, the reaction proceeds over a wide temperature range, even at temperatures below 0° C. Moisture and oxygen are necessarily excluded. The inert atmosphere employed may be, for example, nitrogen, argon or other such suitable inert gas. Depending on the reactivity of the halosilane, higher temperatures up to about 100° C. may be advantageously employed. A reaction time of one hour typically is sufficient to completely convert the starting material to the desired product although shorter or longer reaction times may also be suitably employed. It is necessary to conduct the reaction in the presence of a suitable inert polar solvent such as, for example, an aliphatic ether, e.g., diethyl ether, dipropyl ether, or cyclic ether, or tetrahydrofuran. No reaction occurs in non-polar solvents such as hydrocarbons, e.g., n-hexane, benzene, etc., and the like.

In the known manner for silylation of aromatic hydrocarbons, the chlorosilane, the hydrocarbon and the alkali metal are mixed together and heated over an extended period of time, often as long as several days. However, when proceeding with pyridine in such manner, unclean reaction occurs and no 1,4-disilyl-1,4-dihydropyridine is obtained with only a very low yield of N,N'-disilyl-1,1', 4,4'-tetrahydro-4,4'-dipyridyl. This compound is well known and has previously been obtained by reacting pyridine with bis-(trimethylsilyl)-mercury (H. P. Becker et al., J. Organometal. Chem. 20. P. 3, 1969).

It has now been found in accordance with the present invention that 1,4-disilyl-1,4-dihydropyridine is obtained in improved yields and the formation of N,N'-disilyl-1,1', 4,4'-tetrahydro-4,4'-dipyridyl can be restricted by adding the pyridine to a mixture consisting of a solution of chlorosilane and a dispersion of the alkali metal. The mixture is best prepared at low temperatures below room temperature, e.g., at 0° C. It has already been mentioned that the reaction mixture should contain an inert polar solvent which can, if desired, be replaced partially by a hydrocarbon solvent, e.g., hexane, benzene, toluene or xylene. The pyridine may be dissolved in any inert solvent. It has further been found that lithium, as compared with sodium, advantageously promotes the formation of the 1,4-disilyl-1,4-dihydropyridine to the disadvantage of the dipyridyl derivative.

Compounds of the present invention are useful as catalysts for the addition of chlorosilanes, e.g., trichlorohydrosilane, to $\alpha,\beta$-unsaturated nitriles, esters, aldehydes, ketones and acid chlorides such as acrylonitrile, acrylic acid methylester, acrolein, vinylmethylketone and acrylic acid chloride, and further to unsaturated hydrocarbons having an activated ethylenic bond such as 3-nitro-1-propene, butadiene and styrene. They are further useful as co-catalyst in the polymerization of $\alpha$-olefins, e.g., ethylene and propylene, in conjunction with the Ziegler catalysts. The compounds further are valuable anti-oxidants for, e.g., polyphenylethers, stabilizers for halogenated polyhydrocarbons, e.g., polyvinylchloride and chloroprene, curing agents for silicones and epoxide resins and dyeing improvers for polyesters.

When the compounds of the present invention bear a hydrogen atom in the 4-position, these are rather strong reductants due to their general tendency to restore the full aromatic system. If, for example, 1,4-disilyl-1,4-dihydropyridine is brought into contact with combustible materials such as paper, wood, textile and the like in the presence of oxygen (air), oxidation takes place with generation of heat up to complete carbonization under evolution of smoke; whereby also even spontaneous ignition may arise. Therefore, they are useful as additives to fuels and may impart hypergolic properties.

The compounds of the present invention further are valuable reducing agents for preparing hydrogenation catalysts for noble metals such as rhodium, iridium or platinum compounds. The compounds of the present invention further are utilizable in photoconductive layers of electrophotographic materials.

Moreover, the compounds of the present invention are valuable intermediates in preparing useful compositions of matter. They can be converted to the 4-silylated pyridine, pyrimidines and triazines by contacting with oxygen or air, and to the 4-silylated piperidines, hexahydropyrimidines and hexahydrotriazines by catalytic reduction, e.g., low pressure hydrogenation, in the known manner and subsequent hydrolysis of the N-silyl group. Such N-heterocyclics which are silylated at the 4-position otherwise can only be prepared by laborious multistep procedures. The 4-silylated N-heterocyclics displaying full aromatic character can also be obtained by pyrolysis of the compounds of the present invention and hydrosilane can be recovered. Hydrolytic cleavage of the Si-N bond of the compounds of the present invention leads to the corresponding 4-silyl-1,4-dihydroderivatives of the following formula

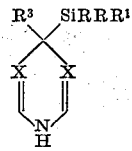

wherein R, $R^1$, $R^3$ and X have the sigificance as previously set forth.

The compounds of the present invention which have a hydrogen atom in the 4-position and at least one double bond of ethylenic character in the heterocycle or heterocyclic unit such as in 1,4-disilyl-dihydropyridine and 1,4-disilyldihydroquinoline are of particular interest because of their ability to undergo reaction with compounds containing activated double bond such as $\alpha,\beta$-unsaturated nitrilohydrocarbons, nitrohydrocarbons, acids, acid chlorides, esters, aldehydes, ketones, amides, sulfones, sulfoxides and the like. The addition is effected by mixing the reactants in a solvent, e.g., tetrahydrofuran, at from about 20° C. to about 100° C. The reaction proceeds with, e.g., 1,4-disilyl-1,4-dihydropyridine as follows

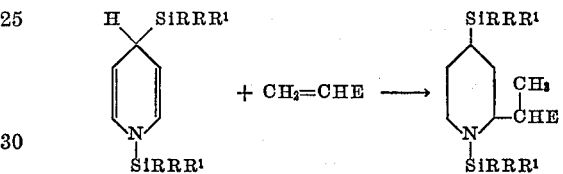

where E stands for an electron withdrawing group. Addition occurs in the 2-position and the product now possesses conjugated double bonds allowing the Diels-Alder reaction with dienophilic compounds.

The invention will be understood more fully by reference to the following specific examples. It is understood that the examples are presented for the purpose of illustration only and are not intended as a limitation of the invention.

EXAMPLE 1

A dispersion of 10.4 g. (1.5 g. atoms) of lithium (particle size: 1–10$\mu$) in 150 ml. tetrahydrofuran is cooled below 0° C. and rapidly mixed with 163 g. (1.5 mole) of trimethylchlorosilane. A solution of 39.6 g. (0.5 mole) of pyridine in 150 ml. tetrahydrofuran is then added dropwise within 1 hour, after which the reaction mixture is stirred for another ½ hour, maintaining the temperature at 0° C. The precipitated lithium chloride and the unreacted lithium are filtered off. The reaction product is removed from solvent and excess trimethylchlorosilane by distillation and also from a further precipitated white solid by a second filtration. The resulting high boiling liquid is distilled in high vacuum to give 82 g. of a light greenish yellow oil, boiling at 50° C./0.1 mm., leaving a residue of 21.5 g. The distillate consists mainly of 1.4-bis-(trimethylsilyl)-1.4-dihydropyridine.

$C_{11}H_{23}NSi_2$.—Calc'd (percent): C, 58.59; H, 10.28; N, 6.21; Si, 24.91. Found (percent): C, 58.03; H, 10.67; N, 5.83; Si, 24.2

Mol.-wt.: Calc'd, 225.5; found, 231

According to GLC-analysis the product contains 4 g. of 4-trimethylsilylpyridine as the only impurity.

Yield of 1.4-bis-(trimethylsilyl)-1.4-dihydropyridine: 78 g. (0.346 mole, 69% calc'd on pyridine).

According to NMR-analysis using dimethylsulfoxide as standard the residue from distillation contains 47 weight-percent of N.N'-bis-(trimethylsilyl)-1.1'.4.4'-tetrahydro-4.4'-dipyridyl (10 g., 0.033 mole, 13% calc'd on pyridine). Recrystallisation in n-hexane of the residue, which solidifies on standing, gives the dipyridyl compound in a pure form as white crystals; M.P. 45–47° C. The structures of the compounds are confirmed by NMR-analysis.

All operations are carried out under an inert gas atmosphere. In like manner other 1,4-bis(triloweralkylsilyl)-1,4-dihydropyridines are obtained.

EXAMPLE 2

Sodium dispersion, freed from paraffin (31.6 g., 1.5 g. atom), is used instead of lithium dispersion employing the procedure of Example 1.

The fraction boiling at 50° C./0.1 mm. amounts to 19.5 g. and contains 18 g. (0.08 mol, 16% calc'd on pyridine) of 1.4-bis-(trimethylsilyl)-1.4-dihydropyridine and 1.5 g. of 4-trimethylsilylpyridine as impurity.

The residue of the distillation (52.5 g.) contains 91 weight-percent or 47.8 g. (0.156 mole, 63% calc'd on pyridine) of N.N'-bis-(trimethylsilyl)-1.1'.4.4'.-tetrahydro-4.4'-dipyridyl.

EXAMPLE 3

Oxygen is passed for 1 hour into a solution of 5.7 g. (0.025 mole) of 1.4-bis-(trimethylsilyl)-1.4-dihydropyridine in 50 ml. of n-hexane with vigorous stirring. The mixture is kept at about 10° C. with a cooling bath. The filtered reaction mixture contains 3.1 g. (0.0204 mole, 82%) of 4-trimethylsilylpyridine.

1.4-bis-(trimethylsilyl)-1.4-dihydropyridine can also be converted to 4-trimethylsilylpyridine by other oxidizing agents, even by shaking with a saturated aqueous solution of $NaHSO_3$. Pyrolysis of 1.4-bis-(trimethylsilyl)-1.4-dihydropyridine at temperatures above 350° C. gives 4-trimethylsilylpyridine and trimethylsilane.

EXAMPLE 4

11.3 g. (0.05 mole) of 1.4-bis-(trimethylsilyl)-1.4-dihydropyridine are added to a suspension of 1.6 g. of catalyst (10% Pd on charcoal) in 20 ml. n-hexane in a hydrogenation vessel. The hydrogen uptake, which sets in immediately, is complete after about 48 hours, consumption of hydrogen being 2.1 liters at 23° C. (86% of the theoretical amount). The reaction product freed of the catalyst and hexane contains 1.4-bis-(trimethylsilyl)-piperidine, as well as traces of unreacted starting compound and 4-trimethylsilylpyridine already present in the starting material as impurity. The crude product is distilled through a spinning-band column. The fraction boiling at 93° C./9 mm. contains 1.4-bis-(trimethylsilyl)-piperidine as a colourless, odourless liquid of 98% purity, $n_D^{20} = 1.4532$.

$C_{11}H_{27}NSi_2$.—Calc'd (percent): C, 57.56; H, 11.86; N, 6.10; Si, 24.48. Found (percent): C, 57.63; H, 12.14; N, 6.03; Si, 24.16
Mol.-wt.: Calc'd, 229.5; found, 220

The structure is confirmed by NMR-analysis.

The Si—N-bond of the above described piperidine derivative is hydrolysed by stirring a solution of the product in ether with diluted HCl at 50° C. for 2 hours. The reaction mixture is made alkaline and the aqueous layer extracted with ether. After distillation of the combined organic layers pure 4-trimethylsilylpiperidine is obtained.

$C_8H_{19}NSi$.—Calc'd (percent): C, 61.07; H, 12.17; N, 8.90; Si, 17.85. Found (percent): C, 61.01; H, 12.34; N, 8.77; Si, 17.80.
Mol.-wt.: Calc'd, 157.3; found, 158

The structure is confirmed by NMR-analysis.

EXAMPLE 5

30.3 g. (0.2 mole) of 4-trimethylsilylpyridine are brought to reaction with 65.2 g. (0.6 mole) of trimethylchlorosilane and 4.17 g. (0.6 g. atom) of a lithium dispersion in 120 ml. tetrahydrofuran as described in Example 1. Distillation under high vacuum gives two main fractions boiling at 66° C./0.1 mm. and 120° C./0.1 mm.

Fraction 1, a greenish yellow oil, consists of pure 1.4.4-tris-(trimethylsilyl)-1.4-dihydropyridine as confirmed by NMR-analysis. Yield: 16.6 g. (0.0558 mole, 28% calc'd on 4-trimethylsilylpyridine).

$C_{14}H_{31}NSi_3$.—Calc'd (percent): C, 56.49; H, 10.50; N, 4.70; Si, 28.31
Mol.-wt.: Calc'd, 297.7

Fraction 2 (21.7 g.) showed a slight red colour and solidifies on cooling. It consists mainly of N.N'-bis-(trimethylsilyl)-4.4' - bis - (trimethylsilyl)-1.1'.4.4'-tetrahydro-4.4'-dipyridyl.

EXAMPLE 6

46.6 g. (0.5 mole) of 4-methylpyridine are converted with 7.65 g. (1.1 g. atoms) of a lithium dispersion and 163 g. (1.5 moles) of trimethylchlorosilane in 300 ml. tetrahydrofuran as outlined in Example 1.

Distillation under high vacuum yields two main fractions boiling at 55° C./0.1 mm. and 110–117° C./0.1 mm.

Fraction 1 consists of pure 1.4-bis-(trimethylsilyl)-4-methyl-1.4-dihydropyridine in form of a yellow-greenish oil.

Yield: 51.8 g. (0.217 mole, 43% calc'd on 4-methylpyridine).

$C_{12}H_{25}NSi_2$.—Calc'd (percent): C, 60.17; H, 10.52; N, 5.85; Si, 23.45

Fraction 2 (44.2 g.) solidifies on standing and consists mainly of N.N' - bis - (trimethylsilyl) - 4.4' - dimethyl-1.1'.4.4'-tetrahydro-4.4'-dipyridyl.

EXAMPLE 7

64.6 g. (0.5 mole) of quinoline are brought to reaction with 10.5 g. (1.5 g. atoms) of a lithium dispersion and 163 g. (1.5 moles) of trimethylchlorosilane in 300 ml. tetrahydrofuran as described in Example 1.

Distillation under high vacuum gives 42.2 g. of a fraction boiling at 100° C./0.1 mm., leaving 70.5 g. of a clear, red resin as residue. The distillate consists mainly of 1.4 - bis - (trimethylsilyl) - 1.4-dihydroquinoline as confirmed by NMR-analysis. The dihydroquinoline compound is a yellow oil.

Yield: 42.2 g. (0.153 mole, 31% calc'd on quinoline).

$C_{15}H_{25}NSi_2$—Calc'd (percent): C, 65.38; H, 9.14; N, 5.08; Si, 20.39.
Mol.-wt.: calc'd 275.5.

EXAMPLE 8

20 g. (0.25 mole) of pyrazine are reacted with 5.2 g. (0.75 g. atom) of a lithium dispersion and 81.5 g. (0.75 mole) of trimethylchlorosilane in 150 ml. tetrahydrofuran as described in Example 1.

After removing the solvent and excess chlorosilane a yellow solid residue remains, which can be recrystallized from ether, yielding 49.8 g. (0.22 mole, 88% calc'd on pyrazine) of 1.4-bis-(trimethylsilyl)-1.4-dihydropyrazine in form of yellow crystals with a melting point of 65° C.

$C_{10}H_{22}N_2Si_2$.—Calc'd (percent): C, 53.03; H, 9.79; N, 12.37; Si, 24.80. Found (percent): C, 52.36; H, 10.64; N, 12.79; Si, 24.05.
Mol.-wt.: calc'd 226.5; found, 234.0.

In like manner other 1,4-bis-(triloweralkylsilyl)-1,4-dihydropyridines are obtained.

Since many embodiments of this invention may be made and since many changes may be made in the embodiments described, the foregoing is to be interpreted as illustrative only and the invention is defined by the claims appended hereto.

We claim:
1. A composition of matter of the formula

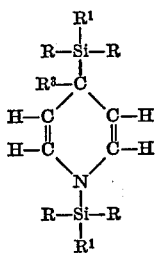

wherein R is methyl; $R^1$ is methyl; and $R^3$ is a member selected from the group consisting of methyl and

2. 1,4-bis-(trimethylsilyl)-1,4-dihydropyridine.
3. 1,4,4-tris-(trimethylsilyl)-1,4-dihydropyridine.
4. 1,4-bis-(trimethylsilyl-4-methyl-1,4-dihydropyridine.

References Cited
FOREIGN PATENTS
3,771    1954    Japan _____ 260—290

HARRY I. MOATZ, Primary Examiner

U.S. Cl. X.R.

260—45.8 N, 45.85 N, 45.8 NZ, 93.1, 94.9 R, 240 D, 248 R, 250 A, 279 R, 283 SC, 293.51, 293.69, 294.8 D, 296 D, 296 T, 297 S

PO-1050
(5/69)

UNITED STATES PATENT OFFICE
CERTIFICATE OF CORRECTION

Patent No. __3,781,291__  Dated __December 25, 1973__

Inventor(s) __Reinhard A. Sulzbach Et Al__

It is certified that error appears in the above-identified patent and that said Letters Patent are hereby corrected as shown below:

IN THE HEADING:

"SILYLATED NITROGEN-CONTAINING HETEROCYCLIC
COMPOSITIONS

Reinhard A. Sulzbach, Burghausen, Germany and
Abul F. M. Iqbal of Glattbrugg, Switzerland,
assignors to Monsanto Company, St. Louis, Mo.,
a corporation of Delaware"

Signed and sealed this 30th day of April 1974.

(SEAL)
Attest:

EDWARD M.FLETCHER,JR.
Attesting Officer

C. MARSHALL DANN
Commissioner of Patents